Photometer Chart translated into excess NO & NO₂
Stack Nitre Rate = 2.2

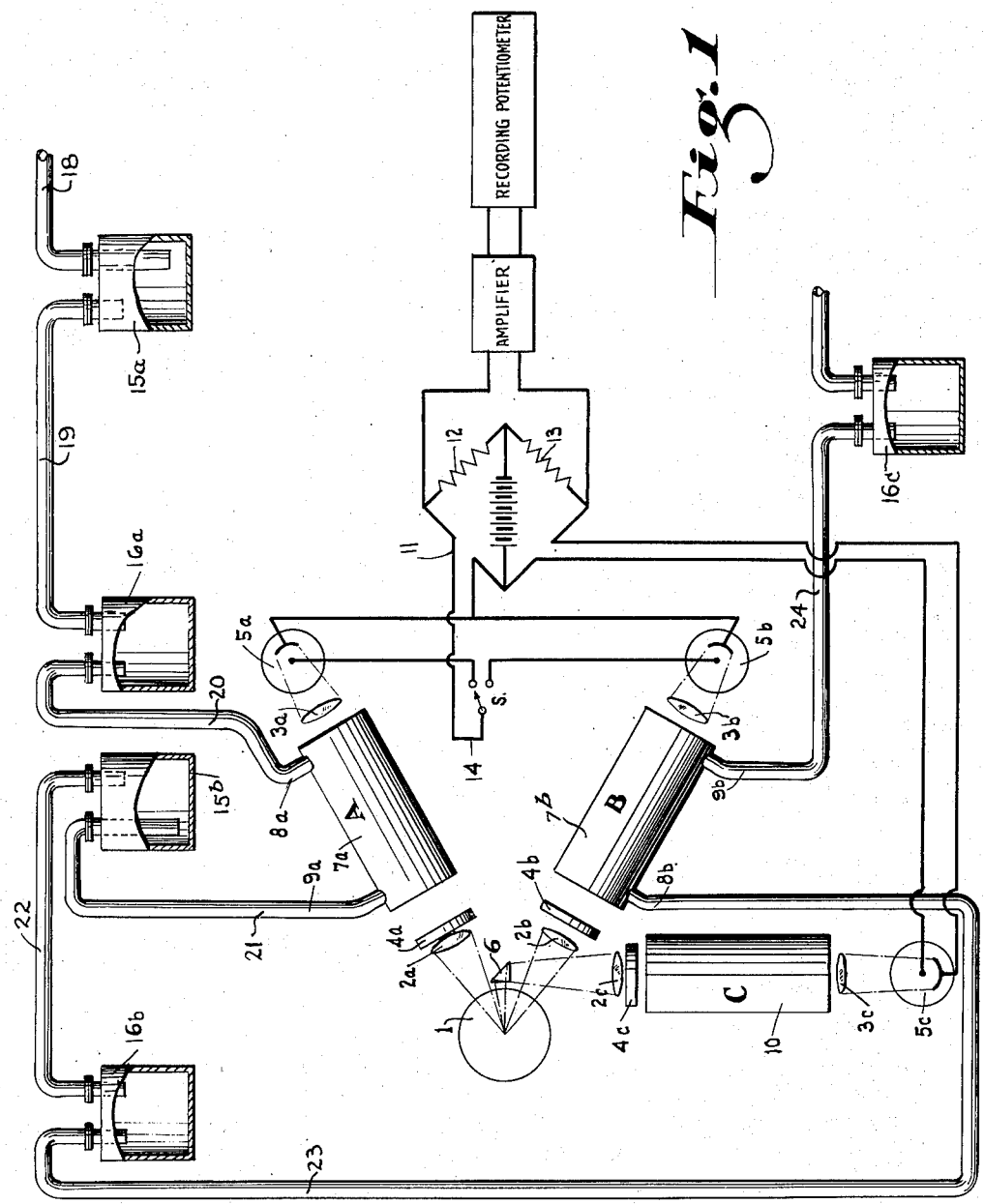

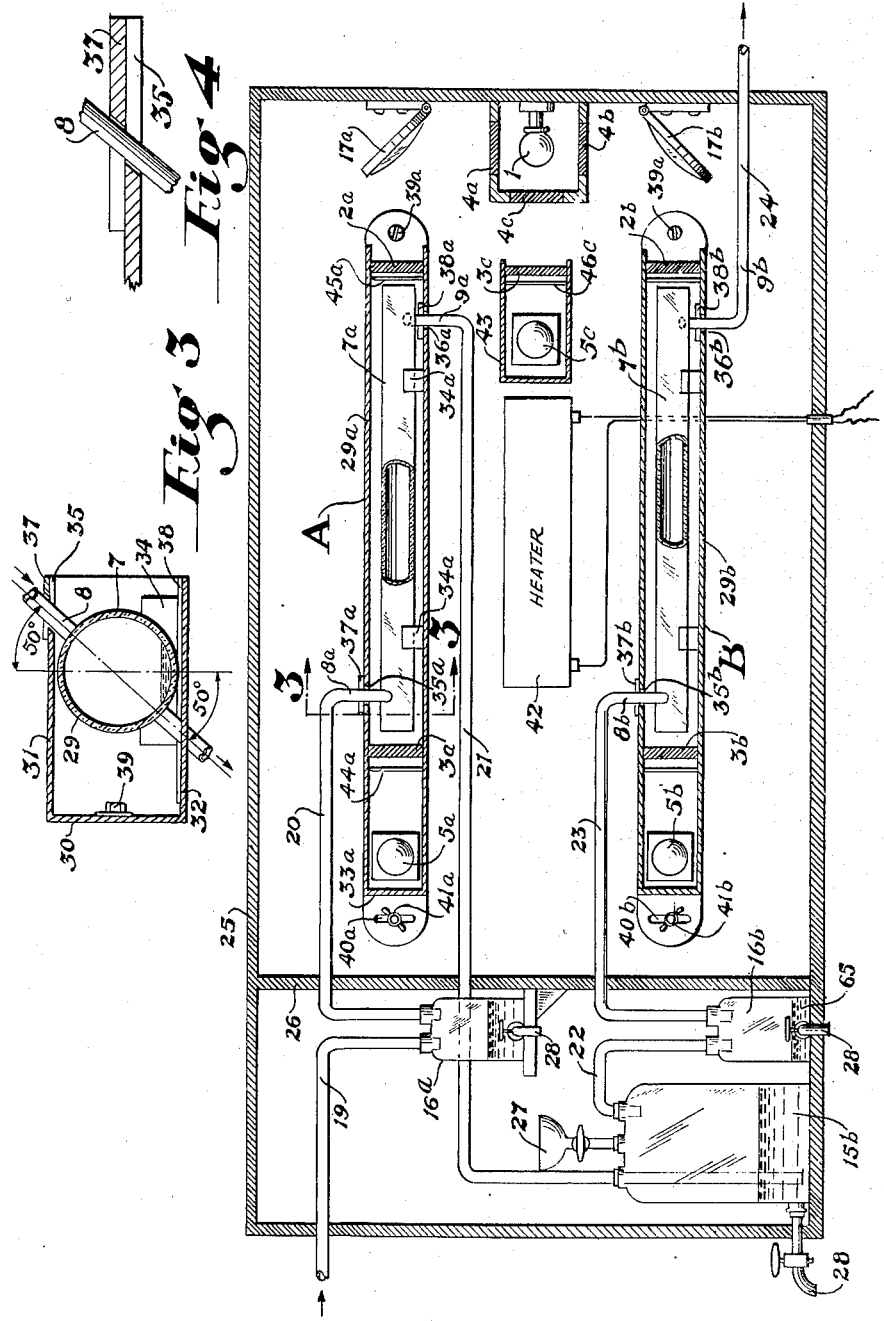

As Photometer Chart Appears

Patented Feb. 26, 1946

2,395,489

UNITED STATES PATENT OFFICE 2,395,489

PHOTOMETRIC PROCESS FOR GAS ANALYSIS

John Major, Rahway, and Edgar W. Thomas, Cranford, N. J., assignors to E. I. du Pont de Nemours & Company, Wilmington, Del., a corporation of Delaware Application May 20, 1942, Serial No. 443,770

5 Claims. (Cl. 23—232)

This invention relates to gas analysis and is particularly directed to methods and apparatus for photometrically measuring the amounts of certain components in a gas mixture.

The analysis of gas mixtures by a determination and comparison of absorptivity of the gas mixture for certain frequencies of radiant energy has long been known and practiced and in recent years has received considerable stimulus in view of the high state of development of photoelectric circuits. Such systems depend upon the selection of a line, that is, a frequency of radiant energy, which is highly absorbed by one component of the gas mixture and comparing the absorptivity of the unknown gas mixture with that of a gas mixture of known constitution.

Systems for effecting such analyses are effective and relatively simple, provided the absorptivity of the one component is high and that of all the other components are negligible, but it is fraught with difficulties if unknown or variable components, also of high absorptivity or otherwise detrimental in the system, are involved.

We have now discovered methods and apparatus for photometrically measuring the amounts of certain components in a gas mixture which avoid the disadvantages of the prior art and have as objects improved simplicity, improved stability and improved accuracy in the measurement, and a greater range of applicability over a wide range of unknown and variable components of the gas mixture.

Figure 6:
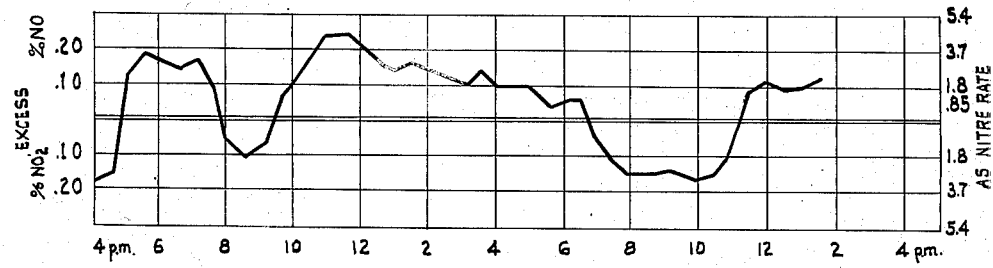
Figure 5:
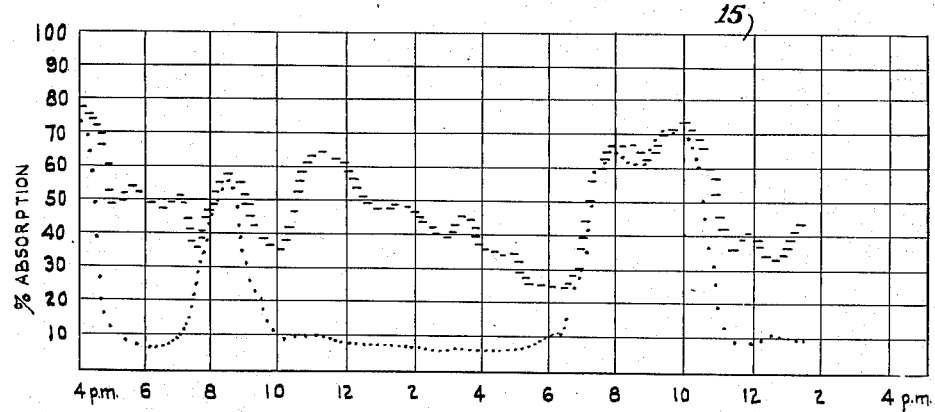

Methods and apparatus embodying these new and useful results and others which will be more particularly pointed out hereinafter are illustrated in the accompanying drawings in which Figure 1 is a diagrammatic view illustrating method and apparatus, Figure 2 is a side elevation in partial section of apparatus suitable for carrying out the method, Figures 3 and 4 are detailed views in section taken along lines 3—3 Figure 2, and Figures 5 and 6 are charts.

The invention is in particular concerned with the analysis of nitre gases in the manufacture of sulfuric acid by the chamber system. Analysis of these chamber gases for the content and quality of the nitre provides a highly satisfactory method for maintaining the chamber system in balance.

In the chamber system for the manufacture of sulfuric acid water, sulfur dioxide, nitrous anhydride and oxygen are reacted to form nitrosyl sulfuric acid which is decomposed by water, yielding sulfuric acid and regenerating nitrous anhydride according to the following general scheme.

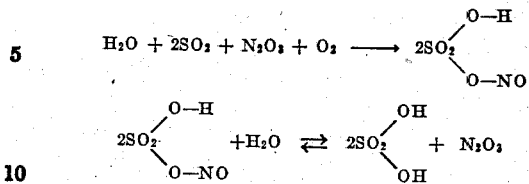

The nitrous anhydride is unstable, breaking up in part into nitric oxide (NO) and nitrogen tetroxide ($NO_2$) according to the following equilibrium:

$$N_2O_3 \rightleftharpoons NO + NO_2$$

In the gaseous state this dissociation is almost entirely complete. Nevertheless, in the chamber process the mixture behaves as if it were all $N_2O_3$. In the chamber process this nitrous anhydride or mixture of nitric oxide and nitrogen tetroxide, or nitre, as such mixtures are spoken of in the art, is recovered by absorption in sulfuric acid of suitable strength in what are known as Gay-Lussac towers.

The economy of the chamber process for the manufacture of sulfuric acid depends in a large measure upon the efficiency of the nitre recovery. These losses may result from insufficient capacity of the Gay-Lussac towers, but in a properly designed plant this is not usually an important source of loss. The really important factor resulting in loss of nitre is that of chamber unbalance. From the equations given above it will be observed that two mols of sulfur dioxide are required for each mol of nitrous anhydride. Any different proportion of these two gases leads to chamber unbalance. If the sulfur dioxide is in excess all the nitre is not wholly regenerated as nitrous anhydride but a portion as nitric oxide. Similarly, if the nitre is in excess the regeneration of nitrous anhydride is incomplete and considerable portion of the nitre appears as excess nitrogen tetroxide. Now as long as the nitric oxide and the nitrogen tetroxide are in equilibrium proportions, that is, are equivalent to nitrous anhydride, all the nitre can be recovered in a properly designed Gay-Lussac nitre recovery system. If, however, either the nitric oxide or the nitrogen tetroxide are in excess the excess passes through the Gay-Lussac towers unabsorbed, thus resulting in loss of nitre. Loss of nitre as nitrous anhydride also may occur if the temperature of the absorbing acid should rise or if its concentration should drop below those optimum to the recovery of nitrous anhydride.

The most common method of operating a chamber system to keep it in balance involves holding a certain temperature differential between the front and back chambers. The operator increases the $SO_2$ or decreases the nitre to increase the difference, and decreases the $SO_2$ or increases the nitre to decrease the difference. In the daytime the color of the stack gases serves as a basis for determining what is a suitable temperature differential, and at all times the strength of the nitrous vitriol is an indicator. A large element of personal judgment is involved, however, the more so because a difference suitable for daytime operation is not necessarily correct to carry the set through the night. Also, the strength of nitrous vitriol can be influenced by changes in flow over the Gay-Lussac towers or by poor absorption.

It has been proposed to overcome these difficulties by actual observation of the ratio of $NO_2$ to NO in the set by means of a photometer. $NO_2$ is a colored gas having high absorptivity for light radiations in the region of the violet whereas NO has relatively no absorptivity. With a gas having high absorptivity in a gas mixture all the other components of which are of relatively low absorptivity the amount of the absorptive gas in the gas mixture can easily be determined photometrically by determining the absorptivity of the gas mixture and comparing it with the absorptivity of standard gas mixtures. It thus should be relatively simple to obtain measurement of the $NO_2$ content of the chamber gases. It is also possible very easily to convert NO to $NO_2$ by suitable oxidation so that by comparing the absorptivity of the untreated gas mixture with that of the treated gas mixture both with relation to standard gas samples the ratio and content of the two gases can easily be determined.

It has been supposed that if the stack gases of a chamber system were thus analyzed photometrically for $NO_2$ and NO, proper chamber balance could be maintained without the uncertainty attached to other methods of operation. Such methods and apparatus for making these photometric analyses as have heretofore been developed have not, however, proved entirely satisfactory. While promising results have been obtained, apparatus and methods having adequate stability and accuracy over the variable conditions of chamber operation and variable constituency of the stack gases have not heretofore been available.

We have now found that these disadvantages may be avoided by properly conditioning the gas mixture to be analyzed prior to and during the analysis. We have traced the difficulties of the prior art methods and apparatus to the presence in the gas to be analyzed of foreign particles or gases or gas mixtures capable of forming foreign particles during the analysis and have provided methods and apparatus, as will be more particularly pointed out, by which such foreign particles are either removed or the amount of them present in or formed in the gas during analysis so regulated as not to interfere with the relative absorptivity of the treated and untreated gas mixtures. We have also traced these difficulties in part to the fact that the $NO_2$ is in equilibrium with the colorless form $N_2O_4$ and have provided for the stabilization of this condition of equilibrium by means of temperature regulation. We have also traced the difficulties in part to variable equilibrium conditions with respect to condensible gases and their condensate and have provided means for regulating or stabilizing these conditions of equilibrium by pretreating the gas to provide a uniform constituency as to said condensible gases and by temperature regulation to control condensation. Thus by observing and analyzing the various causes of the difficulties of the prior art methods and apparatus and providing simple means for their elimination we have improved the sensitivity of the photometric method of analysis and have provided new and improved methods and apparatus whereby the control of such systems as the lead chamber system may be effected with precision.

We shall now describe in detail the methods and apparatus illustrated in the accompanying drawings together with their application to the control of lead chamber systems by the analysis of exit gas from the nitre recovery system. In the description the reference numbers qualified by letters, e. g., 2a and 2b, refer to like parts in a similar circuit or system.

With more particular reference to Figure 1, there is represented at 1 a suitable light source, which may be a mercury vapor lamp. Light from this source is directed through three optical systems A, B and C, composed of lenses 2 and 3 and filter 4 so arranged and designed as to cause a single line which suitably is 4050 Angstrom units to impinge upon the cathode of a photoelectric cell 5. Systems A and B are in direct line with the light source 1 whereas system C receives its light through the prism 6. Consequently the light intensities focused upon the photoelectric cells 5a and 5b are substantially the same and are directly proportional to the intensities focused upon the photoelectric cell 5c.

In each system A and B there is represented an analyzing cell 7 having inlet and outlet ports 8 and 9 through which the gas to be tested may be continuously passed. In the optical system C a blank cell 10 may be incorporated if desired. The photo electric cell 5a is selected or its circuit is adjusted so that its response is identical with that of the photoelectric cell 5b. Thus these two photoelectric cells may be interchanged in the bridge circuit 11 without affecting its balance. Thus one or the other of photoelectric cells 5a and 5b is in one leg of the bridge 11 and the photoelectric cell 5c is in the other leg. By selecting suitable values for the load resistors 12 and 13 the bridge may be balanced and no potential will be developed across the bridge. The bridge circuit 11 acts therefore to rule out any possible variation due to fluctuations in the light source because any variation in one leg of the bridge is a linear function of the variation in the other leg. Any change in the intensity of the light source 1 which would be reflected in the light potential developed by either of photoelectric cells 5a or 5b would effect a corresponding variation in the potential developed by photoelectric cell 5c. Should, however, the potential developed by photoelectric cells 5a or 5b be diminished by reason of there being an absorptive gas in the analyzing cell the bridge would be thrown out of balance and a potential developed across the load resistors 12 and 13. By means of a suitable amplifier this potential may be made to actuate a suitable recording potentiometer.

The recording potentiometer may be of the 2-point recording type so arranged as to actuate the switch 14 to switch first photoelectric cell 5a into circuit and then photoelectric cell 5b, the response from the former being recorded as a series of dots and that from the latter as a series of dashes as will appear on the potentiometer chart as illustrated in Figure 5.

The purpose of the dual line recording is that of completely showing the chamber balance, that is, to show the proportions of NO to $NO_2$. To accomplish this the gas mixture after it passes through analyzing cell 7a is subjected to oxidation to convert the NO to $NO_2$. This transforms a gas component (NO) of the mixture which has relatively little absorptivity for the selected radiant energy to one ($NO_2$) that has relatively high absorptivity for the selected radiant energy. If the gas mixture were devoid of the first of these gases the oxidizing treatment would not change the absorptivity of the gas mixture. Consequently the response obtained when photoelectric cell 5b is in the circuit would be the same as when photoelectric cell 5a is in the circuit, and the dotted line and the dashed line of Figure 5 would coincide. Similarly, if there were none of the highly absorptive gas in the mixture the dotted line would record zero and the dashed line would fluctuate with the percentage of convertible non-absorptive gas in the mixture. If the gas mixture contained equal quantities of the two gases then the value recorded by the dashed line should be approximately twice that recorded by the dotted line.

It will be understood, of course, that the values represented by the potentiometer chart are simply the proportional absorptivity of the converted and unconverted gases and that the interpretation of the chart as above noted gives merely the relative proportions of the two gases. By suitable calibration, however, with gases of known constituency the data recorded as on the potentiometer chart, may be interpreted quantitatively. Figure 6 illustrates how the data recorded on the potentiometer chart are translated into quantitative readings.

In a like manner the potentiometer chart may be made to yield other valuable information. Thus the dotted line is proportional to the content of the highly absorptive gas so that by suitable calibration and translation quantitative values may be obtained. Likewise the dashed line is proportional to the sum of the two components so that by suitable calibration and translation the quantitative value of the sum can be obtained. Thus is it possible to determine in addition to the relative proportions of the two gases, the absolute quantities of each.

Such determinations are of great value in the control and operation of a chamber plant for the manufacture of sulfuric acid for if the analysis is made of the stack gases, that is, the exit gases of the Gay-Lussac absorption system, the condition of balance of the system is immediately shown. Thus from inspection of the potentiometer chart it would be immediately apparent that at 4 p. m. the stack gas contained an excess of $NO_2$ and that at 6 p. m. it contained an excess of NO. The operator would thus be immediately advised of the steps necessary to bring the set again to balance. Moreover, without difficulty the potentiometer chart could be translated into quantitative data so that the operator would know not only what change would be necessary but how much change could be tolerated without throwing the set out of balance on the other side.

In order to precondition the gas for the purposes set out heretofore the gas is first treated to remove any suspended particles, such as mist, and to impart to the gas a reasonably constant moisture content. In the form of the invention illustrated in the drawings this is done by drawing the gas to be analyzed through a scrubber 15a where it is scrubbed with aqueous sulfuric acid. We have found that in the case of the stack gases from a chamber system it is best to scrub the gas mixture with aqueous sulfuric acid of 38°–42° Bé. (45.35 to 50.87%) strength. This acts to remove from the gas mixture any sulfuric acid mist which would otherwise enter the analyzing cell 7a and adversely affect the results as the quantity of mist in the gas mixture might vary. It also acts to impart to the gas mixture a reasonably constant humidity, one that is constant enough not to cause false fluctuations in the results. By maintaining the scrubbing acid at a strength of 38–42° Bé. the water content of the gas is adjusted to such a mean value that it is wet enough to prevent the formation of nitrosyl sulfuric acid and dry enough that the water vapor concentration of the gas will not appreciably reduce the sensitivity of the instrument.

As the conditioned gas mixture passes through the analyzing cell 7a sulfuric acid of about 50° Bé. condenses. This condensation is controlled by the preconditioning of the gas mixture and by maintaining a constant temperature in analyzing cell 7a. It is thus sufficiently constant and regular as not to cause undue false fluctuations. Further improvement in this regard also may be had by inserting a condensate bottle or spray catcher 16a between scrubber 15a and analyzing cell 7a. This serves to keep the latter from becoming overloaded with condensate which might diminish the volume of the cell, and thus change its calibration.

After being analyzed in cell 7a, the gas mixture is drawn off into another scrubber 15b where it is preconditioned, as above described, for analysis in analyzing cell 7b. Condensate bottle 16b serves a similar purpose as 16a. Before passing into cell 7b the gas mixture is treated to oxidize NO to $NO_2$, as for example, by including an oxidizing agent in the scrubber 15b. After being analyzed in cell 7b, the gas mixture is drawn off through a third condensate bottle 16c which collects any spray or condensate from cell 7b, and thereby serves to protect the aspirating mechanism.

We have found further that improved sensitivity of the instrument and improved ease of operation and control is obtained if the oxidation is effected in an aqueous solution containing an oxidizing agent such as chromic acid and sufficient sulfuric acid to prevent absorption of $N_2O_3$. In analyzing stack gases containing even small quantities of NO, some $SO_2$ is invariably present. $SO_2$ concentrations sometimes run as high as 1.00%. This makes oxidation of the NO in apparatus heretofore available very difficult and incomplete at best. By means of our invention, however, these difficulties are entirely avoided because the oxidizing agent oxidizes not only the NO but the $SO_2$ as well. The latter is converted to $SO_3$ in which form it is harmless to the process. The oxidition must be accomplished in an aqueous sulfuric acid solution of a suitable strength to prevent the absorption of nitrogen oxide, such as NO, $NO_2$ or $N_2O_3$, all of which, in view of the equilibrium previously pointed out, are represented by the formula $N_2O_3$. If the sulfuric acid is too weak the oxides are dissolved as nitric acid and if too strong as nitrosyl sulfuric acid. Furthermore, it is desirable to combine the oxidation treatment and the conditioning of the gas mixture into one operation. According to our invention this is accomplished by charging scrubber 16b with aqueous sulfuric acid containing chromic acid, the entire mixture to be from 38 to 42° Bé. We have found that a mixture containing 7% CrO₃ is entirely satisfactory though greater or lesser amounts from a trace up to about 30% may be employed. The chromic acid is replenished as required and the gravity of the mixture is periodically adjusted by adding water or dilute acid to counteract a tendency of the gravity of the mixture to increase.

Referring more particularly to Figure 2 there is illustrated a preferred form of apparatus suitable for carrying out our invention. There are provided three optical systems A, B and C composed of suitable lenses 2 and 3 and suitable filters 4 through which light from mercury vapor lamp 1 is caused to impinge upon the cathode of photoelectric cells 5. The mirrors 17 are included in optical systems A and B in order that the beams focused on the photoelectric cells 5a and 5b may be parallel and horizontal.

In each of optical systems A and B are interposed the analyzing cells 7a and 7b which are connected with scrubbing and spray catching devices 15a, 15b, 16a, 16b and 16c as previously described. The gas to be analyzed is drawn through the scrubber 15a (not shown in Figure 2 because of the desirability of locating this scrubber as close to the gas source as possible) which is suitably a Woulff bottle. The inlet tube extends down far enough into the Woulff bottle 15a to provide adequate scrubbing as the gas is bubbled through the scrubbing medium therein. The scrubbed gas is drawn off at the top of the Woulff bottle through tube 19 which communicates with a spray catcher 16a, also suitably a Woulff bottle, in which both inlet and exit tubes are at the top and neither extends very far into the bottle. The exit tube 20 communicates with the inlet 8a of analyzing cell 7a. The gas leaves the latter by means of outlet 9a through tube 21 into the scrubber 15b which is identical in size and construction to scrubber 15a. The gas mixture is then led through a spray catcher 16b and analyzing cell 7b, the sizes and constructions being the same as for 16a and 7a. The gas leaves the latter by means of outlet 9b which communicates with a spray catcher 16c and this is followed by the aspirating device (not shown). All connections up to outlet 9b are preferably of glass, either tapered or spherical as required, in order to prevent contamination.

With the exception of scrubber 15a which should be as near the gas source as possible, the entire mechanism up to outlet 9b is housed in a single housing 25 divided by the partition 26 into two compartments which are independently accessible so that the scrubbing devices spray catchers 15b, 16a and 16b which are located in the left-hand compartment, may be tended or examined as necessary without disturbing any of the apparatus in the other compartment. Suitable means, such as illustrated at 27, may be provided for filling the scrubbers 15a and 15b, and suitable means such as illustrated at 28, may be provided for draining both the scrubbers and the spray catchers. The exit tubes from analyzing cells 7a and 7b are so constructed that any condensate forming therein drains automatically into 15b and 16c, respectively. Thus by locating all the scrubbing devices in a separate compartment and providing them with suitable means for draining and filling they may be tended simply and effectively with a minimum disturbance of the operation and efficiency of the instrument.

In the right hand compartment the analyzing cells 7a and 7b are mounted horizontally by means of suitable supporting devices 29. The supporting devices are relatively light-tight boxes having a back wall 30, a top wall 31, a bottom wall 32, and an end wall 33. The opposite end is open in order to admit light from the light source 1 and the front is covered by a suitable closure means, not shown. This closure means is held to supporting device 29 by any suitable means. The analyzing cell 7 rests on suitable supports 34 which should be spring clips so that the cell can be removed for cleaning by pulling it outward. The inlet and outlet tubes 8 and 9 project through slots 35 and 36 in the top and bottom walls 31 and 32. These slots are covered by removable covers, 37 and 38, which are slotted at 39, as shown more particularly in Figure 4, so that they may be slid in place about the inlet and outlet in order to make a relatively light-tight enclosure.

The analyzing cell 7 is mounted in the supporting device 29 so that the outlet tube 9 makes an angle of about 50° to the vertical. The slots 35 and 36 are arranged to give this angle to the outlet tube 9 when the analyzing cell 7 is slid into position. This provides a liquid level control means allowing a predetermined amount of liquid to accumulate in the tube. By adjusting the angle of the outlet tube 9 to the vertical it acts as an overflow device to maintain any desired liquid level in the tube. The liquid level is also controlled throughout the length of the tube by providing means whereby the tube maintains a horizontal position. To accomplish this the back wall 30 is pivotally mounted in the compartment at 39 and provided with an arcuate slot 40 and wing-nut fastening device 41. With the wing-nut fastener 41 loosened the supporting device 29 may be adjusted so as to maintain a uniform liquid level in the tube 7 throughout its length. This position is maintained by tightening down on the wing-nut fastener. Universal glass joints, not shown, may be provided in the tubes 20, 21, 23 and 24 to facilitate making these adjustments.

The walls of the right-hand compartment are constructed of heat insulating material and the compartment is provided with a heating unit 42. A uniform temperature may thus be maintained in the compartment. This has two advantageous effects in that it stabilizes the rate of condensation in the cell and also stabilizes the equilibrium between $NO_2$ and $N_2O_4$. Thus variables which would otherwise affect the accuracy of the results are eliminated.

The photoelectric cell 5c is also provided with a suitable supporting housing 43 which also is relatively light-tight in order to prevent variation from stray light sources. In each of the supporting housings there are provided suitable shutter mechanisms, as shown at 44, 45 and 46. By these shutters the amount of light admitted to the analyzing cells may be controlled and the amount of light admitted to the photoelectric cells likewise. These shutters may be used to achieve stability and balance in the instrument and are of value in calibrating it.

The instrument is balanced at zero per cent absorption by drawing air through the analyzing cells, and adjusting the shutters and resistances provided. It is balanced at 100% absorption by blanking off all light to the analyzing cells 7a and 7b and adjusting the rheostat provided. These balancing points are checked periodically as they will change with battery age and other uncontrollable factors.

The instrument can be calibrated by introducing gases of known NO and $NO_2$ concentrations and plotting the results. It may also be calibrated by introducing regular stack gases and comparing the instrument readings with results of chemical analyses of the gases. The latter method is rather impractical since the plant source of gas is quite variable. Any calibration should be done with the preconditioning and oxidizing equipment in the same condition as it is expected to be when in plant use.

To summarize, when the instrument is in plant use, the gases from the flue of the Gay-Lussac nitre recovery system are drawn in succession through the preconditioning apparatus consisting of scrubber 15a, containing aqueous sulfuric acid of 38 to 42° Bé., and condensate spray catcher 16a; analyzing cell 7a, as a result of which the photoelectric cell 5a is influenced in accordance with the amount of $NO_2$ in the gas and the recording potentiometer actuated accordingly; the preconditioning and oxidizing apparatus consisting of scrubber 15b, charged with aqueous sulfuric acid containing chromic acid having a specific gravity of 38 to 42° Bé., and the spray catcher 16b; analyzing cell 7b, where the $NO_2$ augmented in proportion to whatever NO was present in the original gas mixture is again measured as previously described; condensate drain bottle 16c; and finally the aspirating mechanism. The temperature of the analyzing cells should remain essentially constant, and best results are obtained if it is within the range 45 to 50° C. By suitable translation of the results thus obtained, the percentage or ratio of NO and $NO_2$ and the nitre rate are quantitively determined.

While we have described our invention with reference to particular methods and apparatus and with regard to the analysis of particular gases, it will be understood that variation may be made therein without departing from the spirit of the invention and within the scope of the appended claims.

We claim:

1. In a process for photometrically analyzing gases in a lead chamber system for NO and $NO_2$ the steps of scrubbing said gas mixture with aqueous sulfuric acid having a specific gravity of about 38 to 42° Beumé, photometrically determining the absorptivity of said gas mixture with reference to radiant energy strongly absorbed by $NO_2$, treating said gas mixture to oxidize NO to $NO_2$, again scrubbing the gas mixture with aqueous sulfuric acid having a specific gravity of about 38 to about 42° Baumé and determining the absorptivity of the treated gas mixture with reference to said radiant energy, whereby comparing the absorptivity of the treated gas mixture with the absorptivity of the untreated gas as compared with standard gases the analysis of said gas mixture with regard to said components may be determined.

2. In a process of photometrically analyzing gas mixtures containing NO the step of treating said gas mixture with an aqueous solution containing an oxidizing agent and sulfuric acid of such a concentration as to prevent absorption of $N_2O_3$ and thereafter determining the absorptivity of said gas mixture with reference to radiant energy of a frequency strongly absorbed by $NO_2$.

3. In a process of photometrically analyzing gas mixtures containing NO the step of treating said gas mixture with an aqueous solution containing chromic acid and sulfuric acid of such a concentration as to prevent absorption of $N_2O_3$ and thereafter determining the absorptivity of said gas mixture with reference to radiant energy of a frequency strongly absorbed by $NO_2$.

4. In a process of photometrically analyzing gas mixtures containing NO the steps of treating said gas mixture with aqueous sulfuric acid containing chromic acid having a specific gravity of about 38° to 42° Baumé and determining the absorptivity of the treated gas with reference to radiant energy of a frequency strongly absorbed by $NO_2$.

5. In a process for photometrically analyzing exit gas mixtures from a Gay-Lussac nitre recovery system the steps of scrubbing said gas mixture with aqueous sulfuric acid of a specific gravity of about 38° to about 42° Baumé, passing said gas mixture horizontally while maintaining a constant temperature, thereafter scrubbing the gas mixture with aqueous sulfuric acid containing chromic acid having a specific gravity of about 38° to about 42° Baumé and passing the gas mixture horizontally through a second analyzing cell above a body of condensate while maintaining the same temperature, passing radiant energy strongly absorbed by $NO_2$ through each analyzing cell and measuring the relative absorption of said radiant energy in passage through each cell.

JOHN MAJOR.
EDGAR W. THOMAS.